Oct. 28, 1969   T. A. AUXIER   3,475,107
COOLED TURBINE NOZZLE FOR HIGH TEMPERATURE TURBINE
Filed Dec. 1, 1966   2 Sheets-Sheet 1
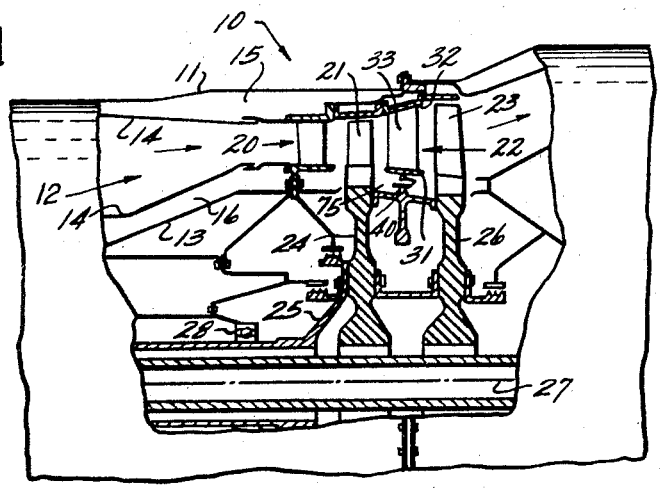
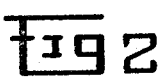
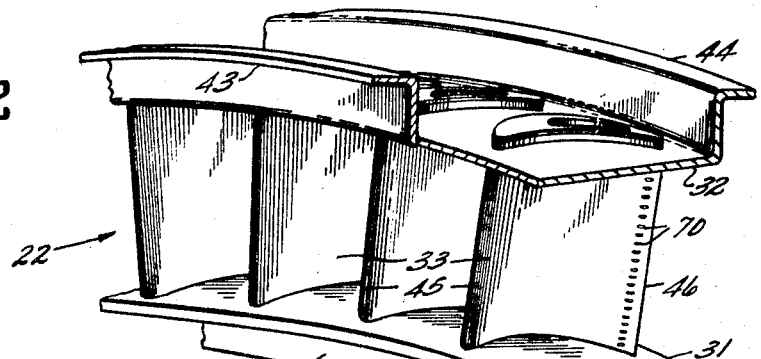
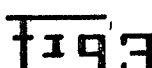
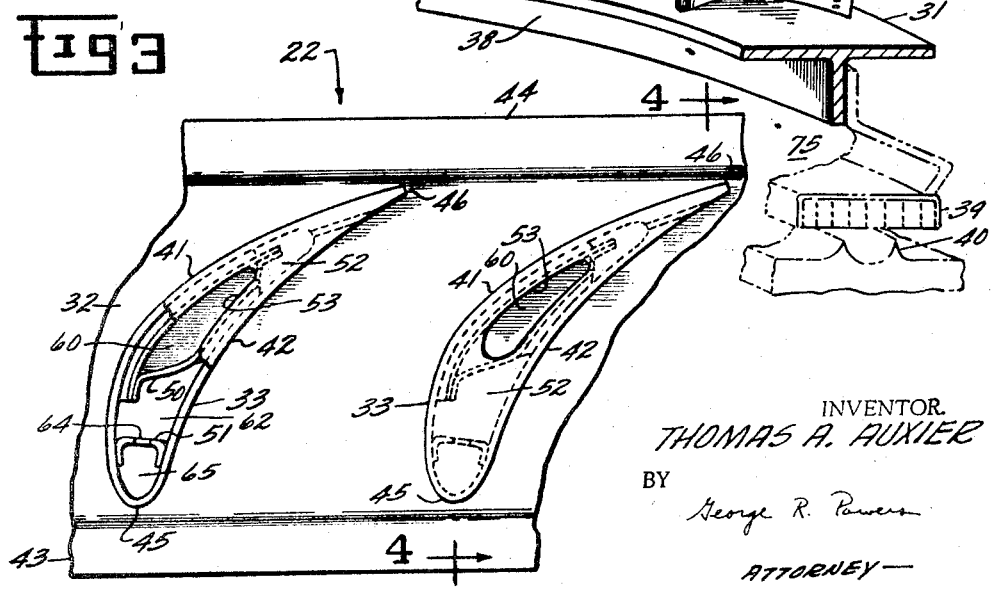
INVENTOR.
THOMAS A. AUXIER
BY
George R. Powers
ATTORNEY

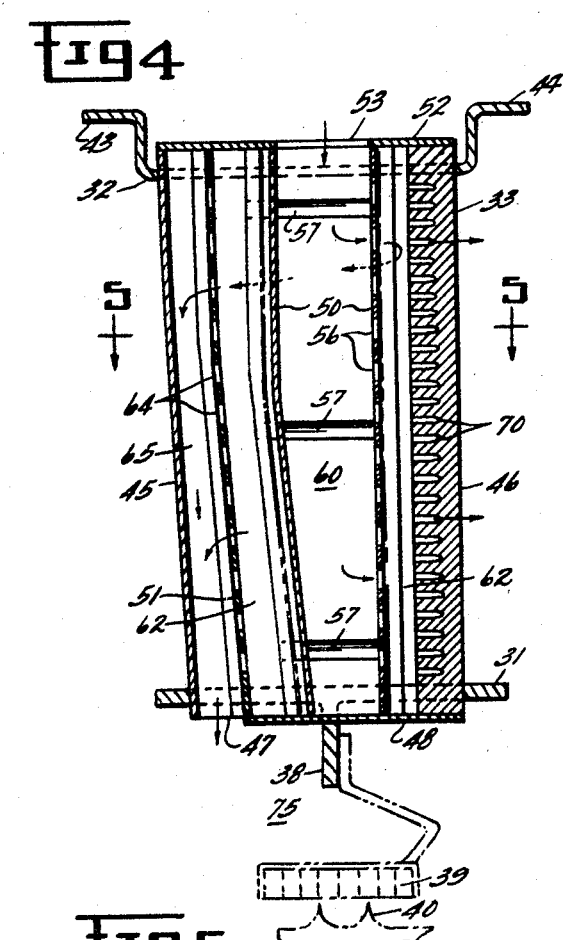
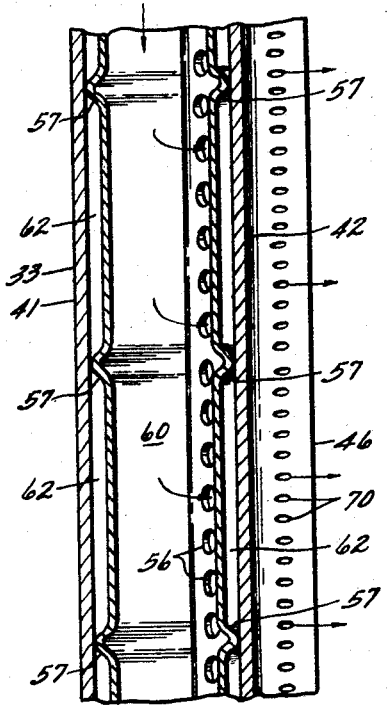
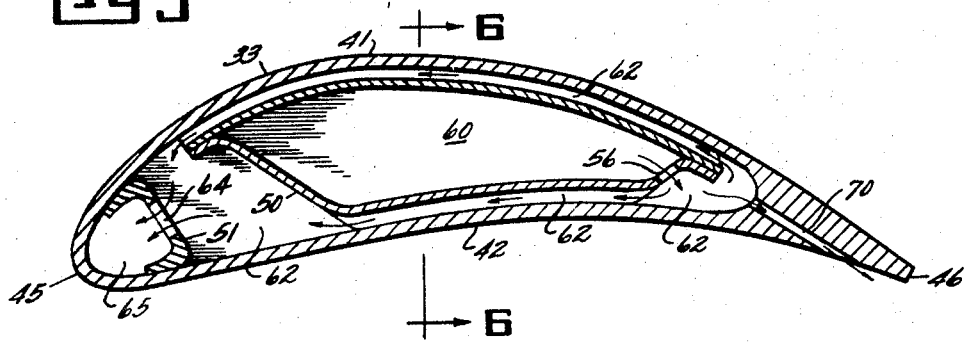

United States Patent Office 3,475,107
Patented Oct. 28, 1969

3,475,107
COOLED TURBINE NOZZLE FOR HIGH TEMPERATURE TURBINE
Thomas A. Auxier, Irvine, Ky., assignor to General Electric Company, a corporation of New York
Filed Dec. 1, 1966, Ser. No. 598,519
Int. Cl. F01d 5/18, 5/08
U.S. Cl. 415—115             12 Claims

ABSTRACT OF THE DISCLOSURE

A turbine stator vane includes a plurality of interior regions through which a cooling fluid is directed, the heat transfer fluid being used for impingement heat transfer at both the leading and the trailing edges and for convection heat transfer at the mid-chord region.

---

This invention relates to a cooled stator structure for high temperature turbomachines and, more particularly, to a turbine nozzle diaphragm assembly having improved means for controlling and directing the flow of cooling fluid throughout the assembly in an efficient and adequate manner.

It is well known that the efficiency of a gas turbine engine is related to the operating temperature of the turbine and that the efficiency may be increased, in theory, by increasing the operating temperature. As a practical matter, however, the maximum turbine operating temperature is limited by the high temperature capabilities of the various turbine elements. Since the engine efficiency is thus limited by temperature considerations, turbine designers have expended considerable effort toward increasing the high temperature capabilities of turbine elements, particularly the airfoil shaped vanes upon which high temperature combustion products impinge. Some increase in engine efficiency has been obtained by the development and use of new materials capable of withstanding higher temperatures. These new materials are not, however, generally capable of withstanding the extremely high temperatures desired in modern gas turbines. Consequently, various cooling arrangements for vanes have been devised for extending the upper operating temperature limit by keeping the vane material at the lower temperatures which it is capable of withstanding without pitting or burning out. As used herein, the term "vane" is a generic term referring to air foil-shaped elements used in high temperature turbomachines. As such, the term applies not only to those members popularly known as vanes, but also to other airfoil-shaped members commonly known as blades, buckets, etc.

Cooling of vanes is generally accomplished by providing internal flow passages within the vanes to accommodate the flow of a cooling fluid, the fluid typically being compressed air bled from either the compressor or the combustor. It is also well known that the engine efficiency theoretically possible is reduced by the extraction of cooling air. It is therefore imperative that cooling air be utilized effectively, lest the decrease in efficiency caused by the extraction of the air be greater than the increase resulting from the higher turbine operating temperature. In other words, the cooling system must be efficient from the standpoint of minimizing the quantity of cooling air required. It is also essential that all portions of the turbine vanes be cooled adequately. In particular, adequate cooling must be provided for the leading and trailing edges of the vanes, these portions being most adversely affected by the high temperature combustion gases.

It has been found that cooling configurations available in the past have tended to have deficiencies with respect to the foregoing requirements. Cooling systems which use minimum quantities of cooling air commonly fail to cool adequately all portions of the vane. As a result, a critical portion such as the trailing edge may crack, burn out, or pit after a relatively short operating period. On the other hand, those systems which adequately cool all portions of the vane, including the leading and trailing edges, commonly require too much air for efficient overall engine performance, the reason being that the cooling air is not used efficiently. For example, an inefficient arrangement may direct the cooling air through the interior of the vane in a manner which results in the creation of low convection heat transfer coefficients or rates of heat transfer. Other characteristics, such as inadequate heat transfer area, can also prevent effective use of the cooling air.

It is therefore an object of this invention to provide for high temperature turbomachines an improved vane structure by which cooling fluid is utilized in a highly efficient manner.

It is another object of this invention to provide for high temperature turbomachines an improved vane structure by which all portions of the vane are cooled adequately.

A further object of this invention is to provide an improved turbine nozzle diaphragm assembly having improved means for controlling and directing the flow of cooling fluid throughout the entire assembly in an adequate and efficient manner.

A still further object of this invention is to provide the foregoing objects in a gas turbine structure that is durable and dependable in operation and relatively simple and inexpensive to manufacture.

Briefly stated, in carrying out the invention in one form, a hollow vane for use in a turbomachine includes partition means dividing the hollow interior of the vane into a plurality of radially extending heat transfer regions, the regions including a centrally disposed plenum, an edge plenum adjacent either the leading or trailing edge of the vane, and passage means surrounding the centrally disposed plenum. A heat transfer fluid such as cooling air is supplied from one end of the vane to the central plenum only. From the central plenum, the entire supply of heat transfer fluid is directed into the passage means adjacent the other radial edge (opposite the edge plenum) as high velocity jets which impinge on the interior wall surfaces of the vane to generate high rates, or coefficients, of convection heat transfer at the edge. At least a portion of the heat transfer fluid then flows through the passage means around the centrally disposed plenum in a chordwise flow pattern, thus providing effective convection heat transfer in the mid-chord region of the vane. From the passage means, the heat transfer fluid is injected into the edge plenum as high velocity jets which impinge on the interior wall surfaces of the edge plenum and thus generate high coefficients of heat transfer therein. The arrangement of this invention thus utilizes the same heat transfer fluid for impingement heat transfer at both vane edges and for convection heat transfer at the mid-chord region. In accordance with a preferred embodiment of the invention, the edge plenum is located at the leading edge, and a portion of the heat transfer fluid is discharged through a multiplicity of passages in the trailing edge after the entire supply of heat transfer fluid impinges on the interior wall surfaces at the trailing edge. The remaining portion of heat transfer fluid is discharged through outlet means communicating with the edge plenum.

By a further aspect of the invention, the partition means dividing the hollow interior of the vane into the heat transfer regions is comprised of a first thin-walled insert positioned within the vane body by suitable spacing means, the central plenum being formed within the insert and the space surrounding the insert forming the passage means. The edge plenum is separated from the passage means by a secondthin-walled radial insert. To provide effective and efficient cooling, the inserts, the spacing means, and the outlet means are proportioned to control the flow of cooling fluid through the vane in accordance with the heat transfer requirements of the various portions of the vane.

While the novel features of this invention are set forth with particularity in the appended claims, the invention, both as to organization and content, will be better understood and appreciated, along with other objects and features thereof, from the following detailed description taken in conjunction with the drawings, in which:

FIG. 1 is a sectional view of a portion of a gas turbine engine having a turbine nozzle diaphragm incorporating the present invention;

FIG. 2 is a pictorial view of a portion of the annular nozzle diaphragm of FIG. 1;

FIG. 3 is a outer end view of a portion of the nozzle diaphragm;

FIGURE 4 is a view taken along viewing line 4—4 of FIG. 3 showing the vane and associated band and seal structure in longitudinal section;

FIG. 5 is a view taken along line 5—5 of FIG. 4 showing the vane in transverse section; and FIG. 6 is a view taken along line 6—6 of FIG. 5.

Referring to the drawings, and particularly to FIG. 1, the high temperature portions of an axial flow gas turbine engine 10 are illustrated, the engine having an outer cylindrical casing 11 circumferentially surrounding the high temperature portions. The illustrated gas turbine structure includes an annular combustion space indicated generally by 12, the combustion space 12 being formed between the cylindrical casing 11 and an inner wall 13. An annular combustion liner 14 is located within the space 12 in spaced relation to the casing 11 and the wall 13, the actual combustion occurring within the annular combustion liner 14. The annular spaces 15 and 16 between the combustion liner 14 and the casing 11 and the wall 13, respectively, are filled with high pressure air discharged by the compressor (not shown). This high pressure air, which is quite cool relative to the high temperature combustion gases within the combustion liner 14, is admitted in a controlled manner to the interior of the combustion liner to support combustion and provide cooling therein. In accordance with the present invention, this relatively cool air is also used for cooling certain turgine elements exposed to the high temperature combustion products.

An annular nozzle diaphragm indicated generally by 20 in FIG. 1 is located at the downstream end of the combustion liner 14 for supplying the hot products of combustion to a row of turbine buckets 21 at the proper velocity and at the proper angle, from which the combustion gases are redirected by an annular nozzle diaphragm, generally indicated by the numeral 22, to a row of turbine buckets 23. The turbine buckets 21 are peripherally mounted on a turbine wheel 24 which, along with its associated shaft 25 and a second turbine wheel 26 having the buckets 23 mounted thereon, is rotatably mounted on the engine axis 27 by suitable mounting means including a bearing arrangement 28. The turbine unit comprising the wheels 24 and 26 and the shaft 25 drives the compressor (not shown) of the engine 10.

With reference still directed to FIG. 1, it will be noted that the entire flow of combustion products passes through the annular nozzle diaphragms 20 and 22 and over the rows of turbine buckets 21 and 23. If the gas turbine engine 10 is to operate at the efficiency and power levels desired in modern gas turbine engines, the combustion products must be discharged from the combustion liner 14 at temperatures higher than those which can be withstood without cooling by vanes made of currently available materials. The present invention makes this desired efficiency possible by providing adequate cooling in a highly efficient manner for all vane portions. In the illustrated embodiment, the cooling arrangement of the invention is applied only to the second stage nozzle diaphragm 22, but it will become clear as this description proceeds that the basic aspects of the invention could be utilized in conjunction with either the nozzle diaphragm 20 or the turbine buckets 21 and 23.

Before turning attention to the precise manner by which the present invention controls and directs the flow of cooling fluid throughout the nozzle diaphragm 22, it will be well to describe briefly, with respect to FIGS. 1 and 2, the general arrangement and construction of the nozzle diaphragm 22, which functions as a unitary, annular structure comprising a plurality of circumferentially spaced airfoil-shaped vanes having vane bodies 33 extending radially between an inner annular band 31 and an outer annular band 32. More particularly, the annular bands 31 and 32, in the preferred embodiment of the invention, are sheet metal members having cut-outs therein for receiving the vane bodies 33. The vane bodies 33 are welded or brazed into the bands 31 and 32 to form the unitary structure. The inner band 31 includes an inwardly projecting annular support flange 38 upon which an annular seal ring 39 may be mounted. The annular seal ring 39 cooperates with a rotating, annular seal structure 40 carried between the turbine wheels 24 and 26 to prevent undesired leakage of hot gases around the vanes 30 inwardly of the inner annular band 31. Furthermore, the outer annular band 32 includes support flanges 43 and 44 which support and locate the diaphragm 22 within the engine casing 11. The nozzle diaphragm 22 is preferably of fabricated construction as just described, but will occur to those skilled in the art as this description proceeds that other forms of construction could be used within the teaching of the present invention.

Turning attention now to FIGS. 2-6, the vane body 33 is a hollow airfoil-shaped member having a convex side wall 41 and a concave side wall 42 interconnecting axially spaced upstream leading and downstream trailing edges 45 and 46, respectively. As best shown by FIGS. 3 and 5, the aerodynamic shape of the vane body 33 at the leading edge 45 is rounded and rather blunt while the trailing edge region is tapered and quite thin. To cool these critical leading and trailing edge regions, as well as the mild-chord region, in accordance with the present invention, each vane body 33 is formed with heat exchange passages therein. To form these passages, the inner end 48 of each vane body 33 is substantially closed, except for an outlet opening 47 therein upstream of the support flange 38, and a pair of thin-walled, sheet metal inserts 50 and 51 are inserted radially into the hollow interior of the vane body 33 from the outer end of the vane body through a large opening initially provided therein, but later closed by a cover plate 52 having a small inlet opening 53 therein. When positioned within the vane body 33, the insert 50 forms a substantially closed space which is open only at the inlet opening 53, except for small throttling openings 56 which will be described presently. The insert 50 which is shaped to conform generally with the interior configuration of the vane body 33 and is held in closely spaced relationship with the side walls 41 and 42 by chordwise ribs 57 projecting therefrom into engagement with the interior wall surfaces of the side walls 41 and 42. The insert 50 thus encloses a centrally disposed plenum 60 within the vane body 33, the plenum 60 constituting a radial passage extending the entire radial extent of the vane boy 33. In addition, the insert 50 and the side walls 41 and 42 cooperate to form radial passage means 62 completely surrounding the insert 50 and the plenum 60. The insert 51, which has a large number of small throttling openings 64 therein, is also inserted radially through the outer end of the vane body 33 and is positioned adjacent the leading edge 45 to form a radially extending leading edge plenum 65. The insert 50 thus separates the central plenum 60 and the passage means 62 while the insert 51 separates the passage means 62 and the edge plenum 65. After the inserts 50 and 51 are positioned within the vane body 33, the outer cover plate 52 is secured in position by welds or other suitable securing means to close the outer ends of the leading edge plenum 65 and the passage means 62, the inlet opening 53 communicating with the centrally disposed plenum 60 only and admitting thereto cooling air from the annular combustion space 15 (see FIG. 1). A multiplicity of passages 70 are provided in the tapered and thin trailing edge region, the radially spaced passages 70 extending between the passage means 62 and the concave wall 42 along substantially the entire trailing edge 46. These closely spaced passages 70 are of very small diameter and are disposed such that cooling air discharged therefrom forms a relatively thin layer on the exterior surface of the trailing portion of the concave wall 42 to provide film cooling.

In operation, relatively cool high pressure air from the combustion space 15 is admitted through the inlet opening 53 in the cover plate 52 to the centrally disposed plenum 60 only. From the centrally disposed plenum 60, the entire supply of cooling air flows through the throttling holes 56 to impinge on the interior vane surfaces at the trailing edge 46. After the entire supply of cooling air provides impingement cooling at the trailing edge, a portion only of the cooling air is discharged through the passages 70 while the remainder of the air flows around the insert 50 in a chordwise flow pattern to the upstream portion of the passage means 62. This remaining portion of the air flows through the throttling holes 64 in the insert 51 to impinge on the interior wall surfaces of the leading edge plenum 65 so as to generate high rates of convection heat transfer thereon. From the leading edge plenum 65, the cooling air is discharged through the outlet opening 47 at the inner end 48 of the vane body to provide cooling for the inner band 31 and to block leakage through the seal elements 39 and 40.

The vane structural arrangement just described provides an adequate and extremely efficient vane cooling system. For example, at the trailing edge region where cooling problems have heretofore been acute, the present invention provides both convection and film cooling with the same cooling fluid. In addition, the convection cooling at the trailing edge is greatly enhanced by impingement cooling and extended heat transfer area. By way of explanation, it is pointed out that the perforations or openings 56 in the insert 50 are throttling holes; since the openings 56 are sized to throttle the flow of cooling fluid, the fluid is accelerated as it flows between the centrally disposed plenum 60 and the passage means 62 at the trailing edge. As a result, the accelerated fluid strikes the interior wall surfaces of the passage means as a plurality of high velocity jets and thereby causes extreme turbulence and high heat transfer coefficients at the trailing edge. This so-called impingement cooling thus causes high rates of convection heat transfer at the trailing edge. From the passage means 62, a portion of the cooling air is discharged through the openings 70 which provide extended heat transfer area. This extremely effective convection cooling is supplemented by film or boundary layer cooling since the angular orientation of the passages 70 causes the discharged cooling fluid to be trapped in the boundary layer on the concave wall 42 and thereby insulate that portion of the vane body 33 from the hot combustion products.

In the mid-chord region, cooling is provided by convection heat transfer to the cooling air flowing in a chordwise direction through the passage means 62 between the ribs 57. This particular arrangement for mid-chord cooling is quite satisfactory from an efficiency viewpoint since the same cooling fluid not only as been used for cooling the trailing edge region, but also is used subsequently for cooling the leading edge region.

In the leading edge region, very effective convection cooling is provided by cooling air throttled through the opening 64 and directed against the interior wall surfaces of the leading edge plenum 65 to generate high coefficients of heat transfer thereon. After impinging on the leading edge surfaces, the cooling air flops inwardly through the leading edge plenum 65 and is discharged through the outlet opening 47. To maintain a constant mass rate of cooling air flow within the plenum 65, the insert 51 may be positioned as shown by FIG. 4 to increase the cross-sectional flow area of the plenum 65 in the inward direction.

As indicated previously, that portion of the cooling air which flows through the plenum 65 is discharged through the outlet opening 47 to cool and block the seal elements 39 and 40 and to provide some cooling for the inner band 31. More particularly, the cooling air discharged from the vane body enters an annular space 75 located inwardly of the inner band 31 and upstream of the annular flange 38 and, with respect to the main flow path through the engine, upstream of the seal elements 39 and 40. The presence of the pressurized cooling fluid in the annulus 75 assures that leakage of hot gases will not occur through the small seal clearances and provides cooling for the seal elements.

To permit efficient utilization of cooling fluid, it is essential that the primary outlet opening 47, the supplementary outlet means comprising the passages 70 at the trailing edge, the inserts 50 and 51 including the perforations therein, and the chordwise ribs 57 be proportioned to permit sufficient, but not excessive, flow through the various portions of the vanes comprising the nozzle diaphragm 22. This can be accomplished by controlling the number and individual flow areas of the various openings, the cross-sectional flow areas of the internal heat transfer regions, and, of course, the pressure differential between the interior regions of the vane body and the static hot gas pressure on the exterior vane surfaces. In other words, the cooling requirements of the various vane portions will dictate the precise relative proportions of the vane elements. By making small changes in the relative proportions of the elements comprising the stator assembly of this invention, the turbine designer will be able to accommodate an extremely wide range of cooling requirements.

It will be obvious to those skilled in the art that the cooling arrangement of this invention is not limited to use in turbine nozzle diaphragms; it may of course be applied with equal utility to turbine buckets for gas turbine engines and to vanes utilized in other high temperature turbomachines such as extremely high pressure compressors. It will also be obvious to those skilled in the art that the general arrangement of this invention may be used if desired for related purposes such as for anti-icing compressor inlet struts and vanes. It will also be obvious that the invention may be used in vanes formed differently from that of the illustrated diaphragm, which are of fabricated construction with passages formed by an insert. For example, the diaphragm could be made of cast segments in which the passages are drilled or formed during the casting process. In addition, cooling fluid other than air could be used if desired.

Other variations will also be obvious to those skilled in the art. For example, a vane assembly could be made within the teaching of this invention in which the entire supply of cooling fluid would first impinge on the interior vane surfaces in the leading edge region rather than the trailing edge region. A portion of the fluid could then be used to cool the trailing edge region. Furthermore, if it is found in practice that the flow through the edge plenum 65 and the outlet opening 47 is insufficient to block and cool the seal elements, the outlet opening 47 could be enlarged to receive some flow from the passage means 62.

It will thous be seen that this invention provides for a high temperature turbomachine a stator assembly utilizing substantially the minimum amount of cooling fluid consistent with adequate cooling of substantially the entire assembly. Furthermore, the fabricated diaphragm construction with vane passages formed by inserts is relatively simple and inexpensive to manufacture and durable and dependable in operation.

What is claimed as new and is desired to secure by Letters Patent of the United States is:

1. In an axial flow turbomachine, a vane comprising:
   a radially extending hollow vane body including end wall means and convex and concave side walls interconnecting first and second spaced-apart radial edges,
   partition means within said vane body dividing the hollow interior of said vane body into a plurality of radially extending heat transfer regions, said regions including a centrally disposed plenum, an edge plenum adjacent said first radial edge, and passage means surrounding said centrally disposed plenum,
   inlet means at one end of said vane body for admitting heat transfer fluid through the end wall means to said centrally disposed plenum only,
   first throttling means between said centrally disposed plenum and said passage means adjacent said second radial edge for accelerating the heat transfer fluid and for directing the high velocity heat transfer fluid from said centrally disposed plenum against the interior wall surfaces at said second radial edge to generate high convection heat transfer coefficients at said second radial edge,
   second throttling means between said passage means and said edge plenum for accelerating the heat transfer fluid and for directing the high velocity heat transfer fluid from said passage means against the interior wall surfaces of said edge plenum to generate high convection heat transfer coefficients at said first radial edge, and
   outlet means for discharging at least a portion of the heat transfer fluid from said edge plenum to the exterior of said vane body, whereby at least a portion of the heat transfer fluid impinges successively on the interior wall surfaces at said second and said first radial edges to provide enhanced heat transfer at said radial edges, 2. A vane as defined by claim 1 including supplementary outlet means for discharging a portion of the heat transfer fluid from said passage means following impingement of the entire supply of heat transfer fluid on the interior wall surfaces of said passage means at said second radial edge.

3. A vane as defined by claim 2 in which said first and second radial edges are leading and trailing edges, respectively, with respect to the normal direction of motive fluid flow through the turbomachine.

4. A vane as defined by claim 3 in which said partition means dividing the hollow interior of said vane body into a plurality of heat transfer regions comprises:
   a first radially extending, thin walled insert disposed within said vane body and forming therein said centrally disposed region,
   spacing means between said insert and the side walls of said vane body to position said insert within said vane body and thereby form said passage means, and a second radially extending insert disposed within said vane body adjacent said first leading edge to form said edge plenum,
   the wall portion of said first insert between said centrally disposed plenum and said passage means adjacent said second trailing edge being perforated to form said first throttling means, and said second insert being perforated to form said second throttling means.

5. A vane as defined by claim 4 in which said spacing means comprises chordwise ribs for permitting chordwise flow of heat transfer fluid through said passage means; said first and second inserts including the perforations therein, said chordwise ribs, said outlet means, and said supplementary outlet means being proportioned to control the flow of heat transfer fluid throughout the interior of the vane body in accordance with the heat transfer requirements of the respective portions of the vane body.

6. In a high temperature axial flow turbine, an annular turbine nozzle diaphragm assembly comprising:
   a plurality of circumferentially spaced, radially extending vanes,
   inner and outer band means circumferentially connecting the inner and outer ends, respectively, of said vanes,
   a generally cylindrical casing circumferentially surrounding said outer band means in spaced relationship thereto,
   annular seal means carried by said inner band means and extending radially inwardly therefrom for cooperating with complementary seal means to control leakage around said inner band means,
   each of said vanes including a hollow vane body including end wall means and convex and concave side walls interconnecting first and second spaced-apart radial edges,
   partition means within said vane body dividing the hollow interior of said vane body into a plurality of radially extending heat transfer regions, said regions including a centrally disposed plenum, an edge plenum adjacent said first radial edge, and passage means surrounding said centrally disposed plenum,
   inlet means at the outer end of said vane for admitting cooling air from the annulus between said outer band means and said casing through the end wall means to said centrally disposed plenum.
   first throttling means between said centrally disposed plenum and said passage means adjacent said second radial edge for accelerating the cooling air and for directing the high velocity cooling air from said centrally disposed plenum against the interior wall surfaces at said second radial edge to generate high convection heat transfer coefficients at said second radial edge,
   second throttling means between said passage means and said edge plenum for accelerating the cooling air and for directing the high velocity cooling air from said passage means against the interior wall surfaces of said edge plenum to generate high convection heat transfer coefficients at said first radial edge, and
   outelt means for discharging at least a portion of the cooling air from said edge plenum,
   whereby at least a portion of the cooling air impinges successively on said second and said first radial edges to provide enhanced heat transfer at said radial edges.

7. An annular turbine nozzle diaphragm assembly as defined by claim 6 in which said partition means dividing the hollow interior of said vane body into a plurality of heat transfer regions comprises:
   a first radially extending, thin walled insert disposed within said vane body and forming therein said centrally disposed region,
   spacing means between said insert and the side walls of said vane body to position said insert within said vane body and thereby form said passage means, and a second radially extending insert disposed within said vane body adjacent said first leading edge to form said edge plenum,
   the wall portion of said first insert between said centrally disposed plenum and said passage means adjacent said second trailing edge being perforated to form said first throttling means, and said second insert being perforated to form said second throttling means.

8. An annular turbine nozzle diaphragm assembly as defined by claim 7 in which said first and second radial edges are leading and trailing edges, respectively, with respect to the normal direction of motive fluid flow through the turbomachine.

9. An annular turbine nozzle diaphragm nozzle assembly as defined by claim 8 including supplementary outlet means comprising of multiplicity of radially spaced passages interconnecting said passage means and the exterior of said vane body at said second trailing edge for discharging a portion of the cooling air from said passage means following impingement of the entire supply of cooling air on the interior wall surfaces of said passage means at said trailing edge.

10. An annular turbine nozzle diaphragm assembly as defined by claim 9 in which said outlet means interconnects said edge plenum and an annulus located inwardly of said inner band means and upstream of said annular seal means.

11. An annular turbine nozzle diaphragm assembly as defined by claim 10 in which said spacing means for positioning said first insert within said vane body comprises chordwise ribs projecting from said insert to engage the interior surfaces of said convex and concave side walls for permitting chordwise flow of cooling air through said passage means; said first and second inserts including the perforations therein, said chordwise ribs, said outlet means, and said supplementary outlet means being proportioned to control the flow of cooling air throughout the interior of the vane body in accordance with the cooling requirements of the respective portions of the vane body.

12. An annular turbine nozzle diaphragm as defined by claim 11 in which said second insert is positioned such that the cross-sectional area of said edge plenum increases in the inward direction such that the mass rate of cooling air flow within said edge plenum per unit of cross-sectional area is substantially constant, whereby the cooling effect produced by cooling air impinging on the interior wall surfaces of said edge plenum is substantially uniform along said first leading edge.

No references cited.

SAMUEL FEINBERG, Primary Examiner

U.S. Cl. X.R.
415—217; 416—90